United States Patent
Hattori et al.

(10) Patent No.: US 11,402,242 B2
(45) Date of Patent: Aug. 2, 2022

(54) DIAL PLATE

(71) Applicant: Yazaki Corporation, Tokyo (JP)

(72) Inventors: Tatsuya Hattori, Shizuoka (JP); Teruomi Sano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 470 days.

(21) Appl. No.: 16/560,979

(22) Filed: Sep. 4, 2019

(65) Prior Publication Data
US 2020/0080872 A1  Mar. 12, 2020

(30) Foreign Application Priority Data

Sep. 7, 2018 (JP) .............................. JP2018-168100

(51) Int. Cl.
*G01D 13/04* (2006.01)
*B60K 35/00* (2006.01)

(52) U.S. Cl.
CPC .............. *G01D 13/04* (2013.01); *B60K 35/00* (2013.01); *B60K 2370/688* (2019.05); *B60K 2370/695* (2019.05)

(58) Field of Classification Search
CPC ........ G01D 13/04; G01D 11/28; B60K 35/00; B60K 2370/688; B60K 2370/695; B60K 2370/341; B60K 37/02
See application file for complete search history.

(56) References Cited

U.S. PATENT DOCUMENTS

| | | | | |
|---|---|---|---|---|
| 3,890,716 A * | 6/1975 | Hatch | ................... | G01D 13/10 33/1 D |
| 6,753,068 B2 * | 6/2004 | Nakamura | ............ | B44C 5/0415 428/172 |
| 6,802,276 B2 * | 10/2004 | Sugimoto | .............. | G01D 11/28 116/286 |
| 9,574,913 B2 * | 2/2017 | Mochizuki | ............. | G01D 13/18 |
| 9,771,031 B2 * | 9/2017 | Hattori | ................... | B60K 35/00 |
| 9,983,347 B2 * | 5/2018 | Fujita | ..................... | G02B 6/006 |
| 10,006,788 B2 * | 6/2018 | Fujita | ..................... | B60K 35/00 |
| 10,048,099 B2 * | 8/2018 | Hattori | .................. | B44C 5/0453 |

(Continued)

FOREIGN PATENT DOCUMENTS

| | | | |
|---|---|---|---|
| JP | 2008-134164 A | 6/2008 | |
| JP | 2009-31020 A | 2/2009 | |

(Continued)

*Primary Examiner* — Nimeshkumar D Patel
*Assistant Examiner* — Tania Courson
(74) *Attorney, Agent, or Firm* — Kenealy Vaidya LLP (57) ABSTRACT

A clear decoration body includes a character display area and an indicator display area that light up and display a design pattern by transmitting light. A first partition layer is laminated on a carbon style irregular surface, shields light, and forms a first partition boundary of the character display area. A carbon colored layer is laminated on the carbon style irregular surface, shields light, and forms a first partition boundary of the indicator display area. The character display area of the clear decoration body is provided with a projecting flat part that at least projects relative to a bottom part of irregularities of a decoration surface toward a side opposite to a viewing side, and that is formed in a flat shape.

14 Claims, 8 Drawing Sheets

(56) References Cited

U.S. PATENT DOCUMENTS

| | | | | |
|---|---|---|---|---|
| 2002/0189526 | A1* | 12/2002 | Sugimoto | G01D 11/28 |
| | | | | 116/286 |
| 2003/0121467 | A1* | 7/2003 | Furuya | B60K 37/02 |
| | | | | 116/286 |
| 2007/0089665 | A1* | 4/2007 | Suzuki | G01D 11/28 |
| | | | | 116/245 |
| 2010/0046103 | A1* | 2/2010 | Yeh | G02B 5/201 |
| | | | | 359/599 |
| 2016/0238418 | A1* | 8/2016 | Fujita | G01D 11/28 |
| 2017/0282716 | A1* | 10/2017 | Mochizuki | B60Q 3/14 |

FOREIGN PATENT DOCUMENTS

| | | |
|---|---|---|
| JP | 2010-216941 A | 9/2010 |
| JP | 2012-37438 A | 2/2012 |

* cited by examiner

DIAL PLATE

CROSS-REFERENCE TO RELATED APPLICATION(S)

The present application claims priority to and incorporates by reference the entire contents of Japanese Patent Application No. 2018-168100 filed in Japan on Sep. 7, 2018.

BACKGROUND OF THE INVENTION

1. Field of the Invention

The present invention relates to a dial plate.

2. Description of the Related Art

Conventionally, as a dial plate, for example, Japanese Patent Application Laid-open No. 2012-037438 discloses a dial plate that visibly displays the speed of a vehicle and the like. This dial plate includes a light transmissive substrate, a notched part that is provided at a side opposite to the viewing side of the substrate and that represents hairline-like irregularities, and a mirror ink layer provided on an area where a design pattern of the notched part is not displayed. In the dial plate, the texture of metallic decoration is enhanced by artificially expressing the metal surface by the notched layer.

For example, it is desired to further clarify the partition boundary of a design pattern of the dial plate disclosed in Japanese Patent Application Laid-open No. 2012-037438 described above.

SUMMARY OF THE INVENTION

Therefore, the present invention has been made in view of the above, and an object of the present invention is to provide a dial plate capable of properly providing a design pattern.

A dial plate according to one aspect of the present invention includes a clear decoration body that includes a main body capable of transmitting light, and that includes a decoration surface provided at a side opposite to a viewing side of the main body and formed with an irregularity for decoration, and a design pattern area capable of lighting up and displaying a design pattern by transmitting light; and a first partition layer that is laminated on the decoration surface, that shields light, and that forms a first partition boundary of the design pattern area, wherein the design pattern area of the clear decoration body is provided with a projecting flat part that at least projects relative to a bottom part of the irregularity of the decoration surface toward a side opposite to the viewing side and that is formed in a flat shape.

According to another aspect of the present invention, in the dial plate, it is preferable that the projecting flat part is formed separate from the main body, and includes a projecting flat surface formed in a flat shape.

According to still another aspect of the present invention, in the dial plate, it is preferable that the projecting flat part is integrally formed with the main body, and includes a projecting flat surface formed in a flat shape.

According to still another aspect of the present invention, in the dial plate, it is preferable that the projecting flat part is formed larger than the first partition boundary formed by the first partition layer when viewed from the viewing side.

According to still another aspect of the present invention, it is preferable that the dial plate further includes a second partition layer that is laminated at the viewing side of the main body, that shields light, and that forms a second partition boundary of the design pattern area matching with the first partition boundary when viewed from the viewing side.

According to still another aspect of the present invention, in the dial plate, it is preferable that the decoration surface is a carbon style irregular surface on which a carbon style pattern is formed by the irregularity.

According to still another aspect of the present invention, in the dial plate, it is preferable that the main body includes a base material capable of transmitting light and a clear layer that is laminated on a surface at a side opposite to the viewing side of the base material and that is formed with the decoration surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will now be described in detail with reference to the accompanying drawings. It is not intended that the present invention be limited by what has been described in the following embodiment. Moreover, the components described below include components that can be easily assumed by a person skilled in the art, and components that are substantially the same as those components. Furthermore, the components described below can be combined with one another as appropriate. Still furthermore, various omissions, replacements, or modifications may be made in a range without departing from the scope and spirit of the present invention.

Embodiment

Figure 1:
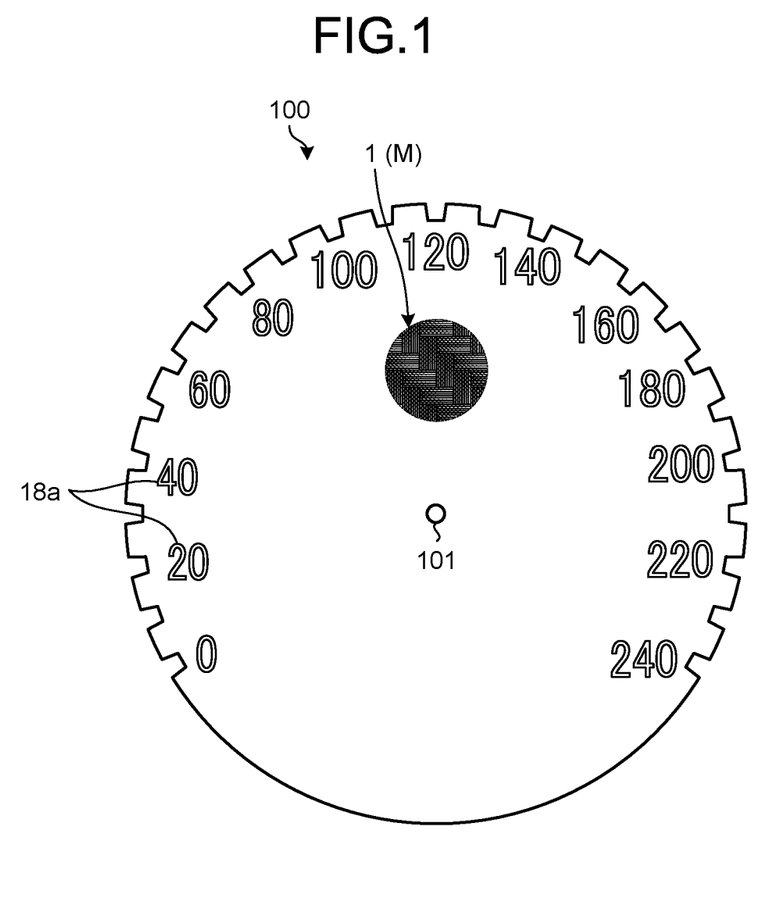
FIG. 1 is a front view illustrating a configuration example of a dial plate according to an embodiment.
Figure 2:
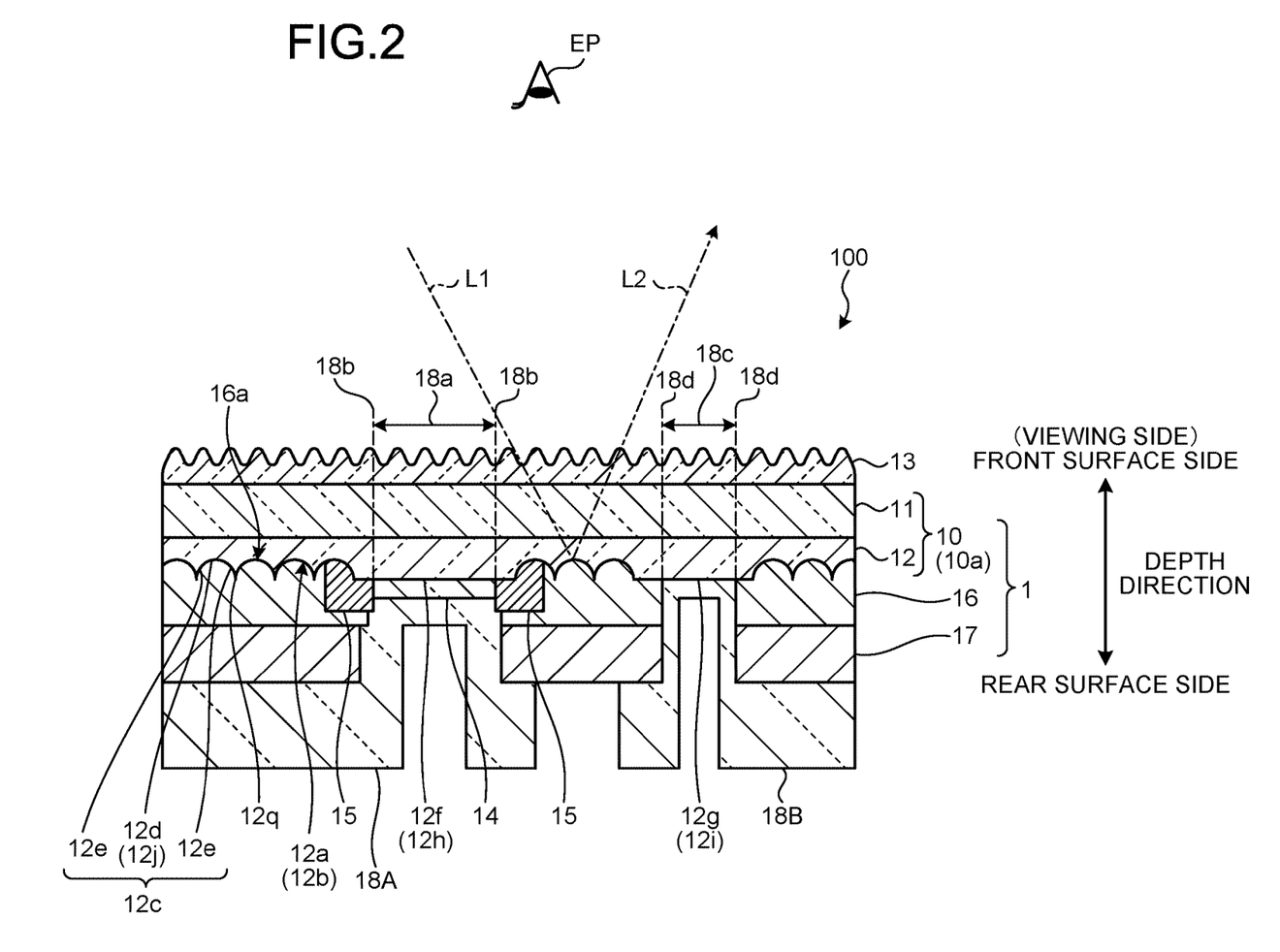
FIG. 2 is a sectional view illustrating a configuration example of the dial plate according to the embodiment.
Figure 3:
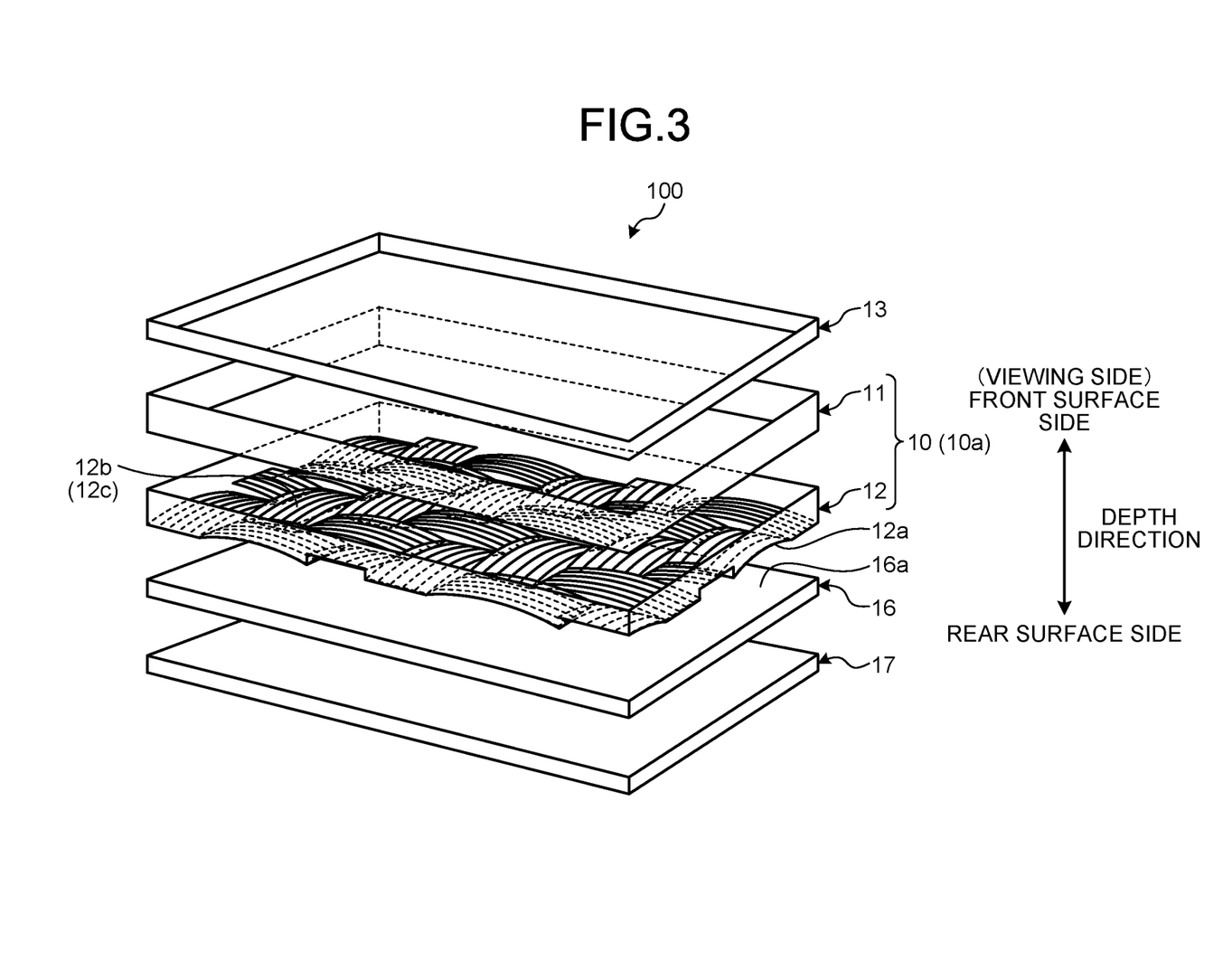
FIG. 3 is an exploded perspective view illustrating a configuration example of the dial plate according to the embodiment.
Figure 4:
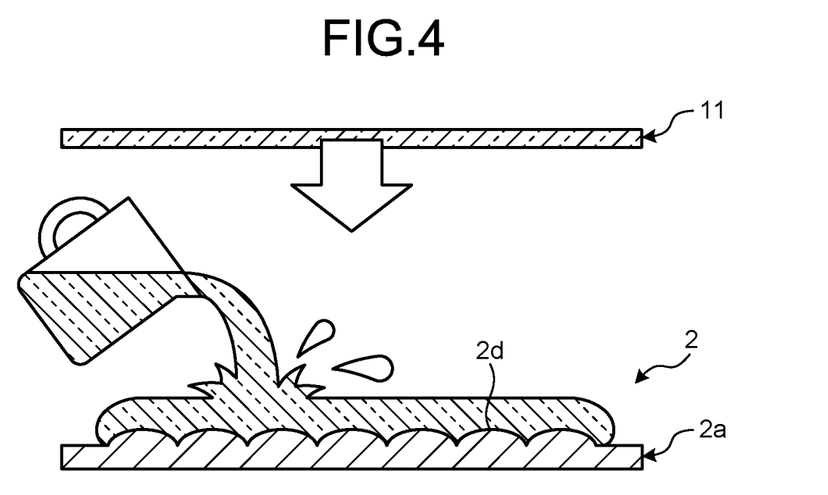
FIG. 4 is a side view illustrating a first step of imprinting in the dial plate according to the embodiment.
Figure 5:
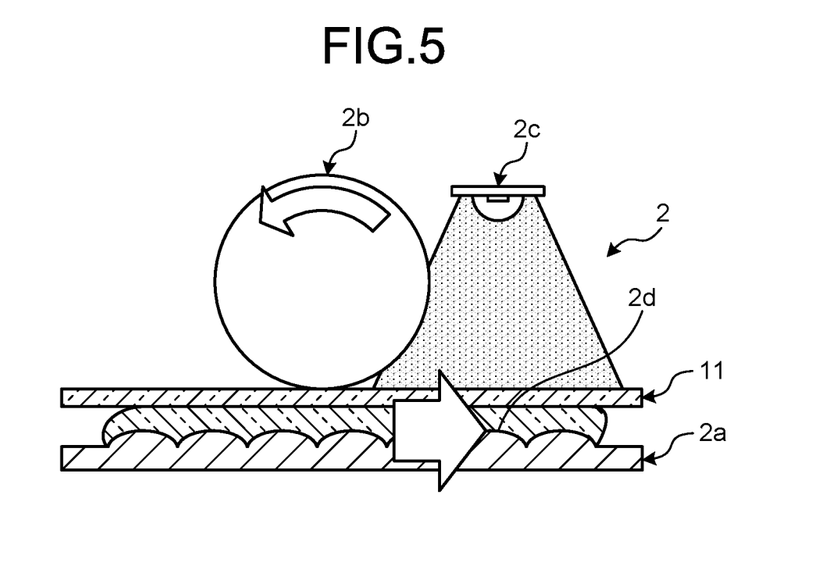
FIG. 5 is a side view illustrating a second step of the imprinting in the dial plate according to the embodiment.
Figure 6:
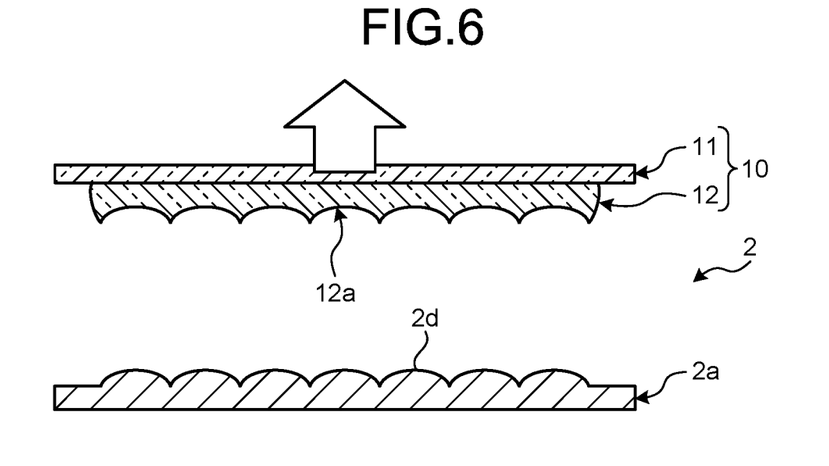
FIG. 6 is a side view illustrating a third step of the imprinting in the dial plate according to the embodiment.

A carbon decoration panel (resin decoration part) 1 and a dial plate 100 according to an embodiment will now be described. FIG. 1 is a front view illustrating a configuration example of the dial plate 100 according to the embodiment. FIG. 2 is a sectional view illustrating a configuration example of the dial plate 100 according to the embodiment. FIG. 3 is an exploded perspective view illustrating a configuration example of the dial plate 100 according to the embodiment. FIG. 3 schematically illustrates characteristics of the layered structure of the dial plate 100. FIG. 4 is a side view illustrating a first step of imprinting in the dial plate 100 according to the embodiment. FIG. 5 is a side view illustrating a second step of the imprinting in the dial plate 100 according to the embodiment. FIG. 6 is a side view illustrating a third step of the imprinting in the dial plate 100 according to the embodiment.

As illustrated in FIG. 1, the carbon decoration panel 1 is applied to the dial plate 100 as a resin decoration part formed with a carbon style pattern M. The dial plate 100 is applied to a vehicle display device (not illustrated) mounted on a vehicle. The vehicle display device configures what is called an on-vehicle meter, and for example, is mounted on an instrument panel provided on a dashboard of a vehicle. The vehicle display device displays various types of information relating to the vehicle, as information to be provided for driving the vehicle.

For example, the dial plate 100 is a speedometer dial plate, and is formed in a circular plate shape. A through hole 101 into which a pointer, which is not illustrated, is inserted, is formed at the center of the dial plate 100. A plurality of character display areas (design pattern areas) 18a that each display the speed are formed near the outer periphery of the dial plate 100 in the circumferential direction. For example, each of the character display areas 18a is an area in the dial plate 100 that emits light emitted from a light source (not illustrated) to the viewing side from which the driver views the dial plate 100. The light source is disposed at a side opposite to the viewing side. Consequently, the driver can recognize the characters in the character display areas 18a that display the speed of the vehicle in the dial plate 100. In FIG. 1, a part of the carbon style pattern M is illustrated. However, for example, the carbon style pattern M is provided on an area excluding the character display areas 18a.

Typically, in this example, the depth direction of the dial plate 100 corresponds to the longitudinal direction of the vehicle applied with the dial plate 100. Moreover, the front surface side of the dial plate 100 is a side facing the driver's seat in the vehicle, and typically, is a viewing side from which the driver seated on the driver's seat views the dial plate 100, in other words, a viewpoint EP side of the driver. Alternatively, the rear surface side of the dial plate 100 is a side opposite to the front surface side in the depth direction, and typically, is a side housed inside the instrument panel.

As illustrated in FIG. 2, the dial plate 100 includes the carbon decoration panel 1, an anti-glare (AG) printed layer 13 serving as a low reflection layer, a design color layer 14, a first partition layer 15, a design layer 18A, and a design layer 18B. The carbon decoration panel 1 includes a clear decoration body 10, a carbon colored layer 16, and a light-shielding printed layer 17. As illustrated in FIG. 3, in the dial plate 100, the AG printed layer 13, the clear decoration body 10, the carbon colored layer 16, and the light-shielding printed layer 17 are laminated in this order, from the front surface side toward the rear surface side in the depth direction.

The clear decoration body 10 includes a main body 10a that transmits light of a wavelength in the visible light region. The main body 10a includes a base material 11 and a clear layer 12. The base material 11 is the base of the dial plate 100. For example, the base material 11 is formed of a resin material such as acrylic resin or polycarbonate that transmits light of a wavelength in the visible light region. The base material 11 is obtained by molding a resin material into a desired plate shape using a mold and the like, and the front surface and the rear surface of the base material 11 are each formed in a flat shape.

The clear layer 12 has the carbon style pattern M. The clear layer 12 is provided at a side opposite to the viewing side of the base material 11, in other words, at the rear surface side of the base material 11, by imprinting, which will be described below. For example, the clear layer 12 is made of a photocurable resin material (ink) that transmits light of a wavelength in the visible light region, and that is cured by being irradiated with ultraviolet (UV) light. As illustrated in FIG. 2, the clear layer 12 includes a carbon style irregular surface 12a. The carbon style irregular surface 12a is provided at a side opposite to the base material 11 of the clear layer 12, and on which the carbon style pattern M is formed by a plurality of irregularities 12b for decoration. The irregularities 12b form a plurality of unit pattern bodies 12c. Each of the unit pattern bodies 12c configures the texture of an artificial carbon fiber bundle that artificially represents the actual carbon fiber bundle by a prepreg. In the unit pattern body 12c, the artificial carbon fiber that artificially represents the actual carbon fiber is formed one by one. In this example, the prepreg is obtained by impregnating the actual woven carbon fiber with resin to cure. The unit pattern body 12c includes a top surface part 12d and a pair of curved parts 12e. The top surface part 12d is placed at the center part of the unit pattern body 12c in the extending direction of the artificial carbon fiber bundle. The pair of curved parts 12e are placed at both sides of the top surface part 12d in the extending direction of the artificial carbon fiber bundle, and are each formed in a curved shape. The top surface part 12d of the unit pattern body 12c is formed in a concave shape toward the viewing side from a side opposite to the viewing side. The top surface part 12d is a portion corresponding to a bottom part 12j of the unit pattern body 12c in the depth direction.

The AG printed layer 13 suppresses the reflection of light. The AG printed layer 13 is laminated at the viewing side of the base material 11, and is provided across the entire surface of the base material 11. For example, the AG printed layer 13 is formed at the viewing side of the base material 11 by screen printing. On the AG printed layer 13, fine irregularities are formed at the viewing side of the base material 11. By diffusing incident light L1 entering from the viewing side by the fine irregularities, the AG printed layer 13 suppresses the regular reflection of the incident light L1 on the surface at the viewing side of the base material 11.

The design color layer 14 forms a design pattern of the dial plate 100. For example, the design color layer 14 forms a design pattern for displaying the speed of the vehicle on the dial plate 100. The design color layer 14 has a transmission property for transmitting light, and for example, is colored in white, red, or the like. The design color layer 14 is laminated on a projecting flat surface 12h of the carbon style irregular surface 12a in the clear layer 12. For example, the design color layer 14 is formed by printing an ink containing a resin material on the projecting flat surface 12h. For example, the design color layer 14 is formed using a screen printing machine. The screen printing machine prints the ink colored in white, red, or the like on the projecting flat surface 12h. The design color layer 14 transmits the light emitted from the light source (not illustrated) provided at a side opposite to the viewing side (rear surface side), and emits the transmitted light to the clear layer 12.

The first partition layer 15 forms an outline of the design pattern relating to the vehicle. For example, the first partition layer 15 forms the outline of the design pattern that displays the speed of the vehicle on the dial plate 100. The first partition layer 15 has a light-shielding property for shielding light, and for example, is colored in black or the like. The first partition layer 15 is laminated on the carbon style irregular surface 12a of the clear layer 12. For example, the first partition layer 15 is formed by printing an ink containing a resin material on the carbon style irregular surface 12a. For example, the first partition layer 15 is formed using the screen printing machine. The screen printing machine prints the ink colored in black or the like on the carbon style irregular surface 12a. For example, in the carbon style irregular surface 12a, the screen printing machine prints the ink on a projecting flat part 12f, which will be described below, along a first partition boundary 18b indicating the outline of the character display area 18a. The first partition layer 15 forms the outline (first partition boundary 18b) of the character display area 18a, and shields the incident light from a side opposite to the viewing side (rear surface side).

The carbon colored layer 16 is a colored layer colored in carbon color. In this example, the carbon color is black (carbon black), for example. The carbon colored layer 16 is laminated at the carbon style irregular surface 12a side of the clear layer 12. For example, the carbon colored layer 16 is formed by printing an ink containing a resin material on the carbon style irregular surface 12a. For example, the carbon colored layer 16 is formed by screen printing. For example, the screen printing machine prints the carbon-colored ink on the carbon style irregular surface 12a. For example, in the carbon style irregular surface 12a, the screen printing machine prints the ink on an area excluding the character display area 18a and an indicator display area (design pattern area) 18c. Consequently, the carbon style pattern M does not appear on the character display area 18a and the indicator display area 18c. For example, in the carbon style irregular surface 12a, the screen printing machine prints the ink on a projecting flat part 12g, which will be described below, along a first partition boundary 18d indicating the outline of the indicator display area 18c. The carbon colored layer 16 forms the outline (first partition boundary 18d) of the indicator display area 18c.

The carbon colored layer 16 includes a base material obtained by coloring a resin material in carbon color, and a glittering material added to the base material. The carbon colored layer 16 does not transmit light. The glittering material has a refractive index different from that of the resin material of the clear layer 12, and has glossiness. For example, the glittering material includes aluminum, silver, pearl, or the like. The carbon colored layer 16 includes a reflecting surface 16a at the carbon style irregular surface 12a side. The reflecting surface 16a is provided so as to come into contact with the irregularities 12b of the carbon style irregular surface 12a, and formed with the shape of the carbon style irregular surface 12a. In other words, the shape of the reflecting surface 16a is the same as that of the unit pattern body 12c of the carbon style irregular surface 12a. More specifically, when viewed from the viewing (viewpoint EP) side, the portion of the reflecting surface 16a that comes into contact with the top surface part 12d of the unit pattern body 12c is formed in a concave shape toward the viewing side from a side opposite to the viewing side. In this manner, when viewed from the viewing (viewpoint EP) side, in the reflecting surface 16a, the texture of the artificial carbon fiber bundle is formed, and the artificial carbon fiber is formed one by one. The reflecting surface 16a reflects the incident light L1 that has transmitted through the clear decoration body 10 toward the viewing side as reflecting light L2.

The light-shielding printed layer 17 is a light-shielding layer for shielding light. The light-shielding printed layer 17 is laminated on the carbon colored layer 16 at a side opposite to the viewing side. For example, the light-shielding printed layer 17 is formed by printing an ink containing a resin material on the carbon colored layer 16. For example, the light-shielding printed layer 17 is formed using the screen printing machine. The screen printing machine prints the ink colored in light-shielding color on the rear surface side of the carbon colored layer 16. For example, at the rear surface side of the carbon colored layer 16, the screen printing machine prints the ink on an area excluding the character display area 18a and the indicator display area 18c. The light-shielding printed layer 17 shields the incident light from a side opposite to the viewing side (rear surface side).

The design layer 18A is laminated on the character display area 18a. The character display area 18a is an area that lights up and displays the design pattern relating to the vehicle, by transmitting light. The design layer 18A is laminated at the carbon style irregular surface 12a side of the clear layer 12. For example, the design layer 18A is formed by printing an ink containing a resin material on the character display area 18a of the clear layer 12. For example, the design layer 18A is formed using the screen printing machine. The screen printing machine prints a translucent ink colored in a desired color on an area including the design color layer 14 of the character display area 18a of the clear layer 12. The design layer 18A transmits the light emitted from the light source (not illustrated) provided at a side opposite to the viewing side (rear surface side), and emits the transmitted light to the design color layer 14. In a display mode in which the carbon style pattern M is not superimposed, the speed of the vehicle is displayed on the character display area 18a of the dial plate 100.

The design layer 18B is laminated on the indicator display area 18c. The indicator display area 18c is an area that lights up and displays the design pattern relating to the vehicle by transmitting light. The design layer 18B is laminated at the carbon style irregular surface 12a side of the clear layer 12. For example, the design layer 18B is formed by printing an ink containing a resin material on the indicator display area 18c of the clear layer 12. For example, the design layer 18B is formed using the screen printing machine. The screen printing machine prints the translucent ink on an area including the indicator display area 18c of the clear layer 12. The design layer 18B transmits the light emitted from the light source (not illustrated) provided at a side opposite to the viewing side (rear surface side), and emits the transmitted light to the clear layer 12. In a display mode in which the carbon style pattern M is not superimposed, an indicator of the vehicle is displayed on the indicator display area 18c of the dial plate 100.

Next, with reference to FIG. 4 to FIG. 6, steps of imprinting in the dial plate 100 will be described. An operator performs imprinting using an imprinting machine 2. The imprinting machine 2 includes a mold 2a, a roller 2b, and a UV metal halide lamp 2c. A plurality of irregularities 2d for forming the unit pattern bodies 12c of the carbon style pattern M are formed on the surface of the mold 2a. Moreover, a concave part (not illustrated) for forming the projecting flat parts 12f and 12g is formed on the surface of the mold 2a. First, as illustrated in FIG. 4, the operator pours a liquid photocurable resin material (ink) on the surface of the mold 2a formed with the irregularities 2d. Next, as illustrated in FIG. 5, by operating the imprinting machine 2, the operator irradiates the photocurable resin material with UV light by the UV metal halide lamp 2c, while pressing the base material 11 against the photocurable resin material that is poured on the surface of the mold 2a using the roller 2b. Consequently, the photocurable resin material is cured. Next, as illustrated in FIG. 6, by operating the imprinting machine 2, the operator separates the photocurable resin material (clear layer 12) laminated on the base material 11 from the mold 2a. Thus, it is possible to form the clear decoration body 10 formed with the carbon style irregular surface 12a.

As illustrated in FIG. 2, the carbon style irregular surface 12a includes the projecting flat parts 12f and 12g. The projecting flat part 12f is provided on the character display area 18a of the carbon style irregular surface 12a. The projecting flat part 12f is integrally formed with the main body 10a, and at least projects relative to the bottom part 12j of the irregularities 12b of the carbon style irregular surface 12a, toward a side opposite to the viewing side (rear surface side). For example, the projecting flat part 12f projects as high as a top part 12q of the irregularities 12b of the carbon style irregular surface 12a in the depth direction.

The projecting flat part 12f has the projecting flat surface 12h formed in a flat shape, at the rear surface side of the carbon style irregular surface 12a. The projecting flat surface 12h is formed larger than the first partition boundary 18b (character display area 18a) formed by the first partition layer 15 when viewed from the viewing side. In other words, the projecting flat surface 12h protrudes more to the outside than the first partition boundary 18b formed by the first partition layer 15 when viewed from the viewing side. That is, the first partition boundary 18b formed by the first partition layer 15 is placed inside of the projecting flat surface 12h when viewed from the viewing side. With this configuration, in the dial plate 100, it is possible to form the first partition boundary 18b formed by the first partition layer 15 within a range of the projecting flat surface 12h.

The projecting flat part 12g is provided on the indicator display area 18c of the carbon style irregular surface 12a. The projecting flat part 12g is integrally formed with the main body 10a, and at least projects relative to the bottom part 12j of the irregularities 12b of the carbon style irregular surface 12a, toward a side opposite to the viewing side (rear surface side). For example, the projecting flat part 12g projects as high as the top part 12q of the irregularities 12b of the carbon style irregular surface 12a in the depth direction.

The projecting flat part 12g has a projecting flat surface 12i formed in a flat shape, at the rear surface side of the carbon style irregular surface 12a. The projecting flat surface 12i is formed larger than the first partition boundary 18d (indicator display area 18c) formed by the carbon colored layer 16 when viewed from the viewing side. In other words, the projecting flat surface 12i protrudes more to the outside than the first partition boundary 18d formed by the carbon colored layer 16 when viewed from the viewing side. That is, the first partition boundary 18d formed by the carbon colored layer 16 is placed inside of the projecting flat surface 12i when viewed from the viewing side. With this configuration, in the dial plate 100, it is possible to form the first partition boundary 18d formed by the carbon colored layer 16 within a range of the projecting flat surface 12i.

In this manner, the dial plate 100 according to the embodiment includes the clear decoration body 10, the first partition layer 15, and the carbon colored layer 16. The clear decoration body 10 includes the main body 10a that transmits light. The clear decoration body 10 also includes the carbon style irregular surface 12a that is provided at a side opposite to the viewing side of the main body 10a and that is formed with the irregularities 12b for decoration. Moreover, the clear decoration body 10 includes the character display area 18a and the indicator display area 18c that light up and display the design pattern by transmitting light. The first partition layer 15 is laminated on the carbon style irregular surface 12a, shields light, and forms the first partition boundary 18b of the character display area 18a. The carbon colored layer 16 is laminated on the carbon style irregular surface 12a, shields light, and forms the first partition boundary 18d of the indicator display area 18c. The character display area 18a of the clear decoration body 10 is provided with the projecting flat part 12f that at least projects relative to the bottom part 12j of the irregularities 12b of the decoration surface toward a side opposite to the viewing side, and that is formed in a flat shape. Moreover, the indicator display area 18c of the clear decoration body 10 is provided with the projecting flat part 12g that at least projects relative to the bottom part 12j of the irregularities 12b of the decoration surface toward a side opposite to the viewing side, and that is formed in a flat shape.

With this configuration, in the dial plate 100, by printing the first partition layer 15 on the projecting flat part 12f, it is possible to form the first partition boundary 18b of the character display area 18a. Consequently, for example, compared to when the first partition layer 15 is printed on the irregularities 12b, the dial plate 100 can suppress a step from being formed on the printing surface. Thus, it is possible to suppress dripping of ink and unevenness. Hence, in the dial plate 100, it is possible to suppress the first partition boundary 18b of the character display area 18a from becoming unclear. Moreover, in the dial plate 100, by printing the carbon colored layer 16 on the projecting flat part 12g, it is possible to form the first partition boundary 18d of the indicator display area 18c. Consequently, for example, compared to when the carbon colored layer 16 is printed on the irregularities 12b, the dial plate 100 can suppress a step from being formed on the printing surface. Thus, it is possible to suppress dripping of ink and unevenness. Hence, in the dial plate 100, it is possible to suppress the first partition boundary 18d of the indicator display area 18c from becoming unclear. Thus, even when the carbon style irregular surface 12a is provided, the dial plate 100 is capable of properly providing a design pattern.

In the dial plate 100 described above, the projecting flat part 12f is integrally formed with the main body 10a of the clear decoration body 10, and includes the projecting flat surface 12h formed in a flat shape. Moreover, the projecting flat part 12g is integrally formed with the main body 10a of the clear decoration body 10, and includes the projecting flat surface 12i formed in a flat shape. With this configuration, in the dial plate 100, it is possible to suppress a step from being formed on the printing surface by the projecting flat surface 12h, and suppress the first partition boundary 18b of the character display area 18a from becoming unclear. Moreover, in the dial plate 100, it is possible to suppress a step from being formed on the printing surface by the projecting flat surface 12i, and suppress the first partition boundary 18d of the indicator display area 18c from becoming unclear.

In the dial plate 100 described above, the projecting flat part 12f is formed larger than the first partition boundary 18b formed by the first partition layer 15 when viewed from the viewing side. Moreover, the projecting flat part 12*g* is formed larger than the first partition boundary 18*d* formed by the carbon colored layer 16 when viewed from the viewing side. With this configuration, in the dial plate 100, it is possible to provide the first partition boundary 18*b* of the character display area 18*a* on the projecting flat part 12*f*, and suppress the first partition boundary 18*b* from becoming unclear. Moreover, in the dial plate 100, it is possible to provide the first partition boundary 18*d* of the indicator display area 18*c* on the projecting flat part 12*g*, and suppress the first partition boundary 18*d* from becoming unclear.

In the dial plate 100 described above, the decoration surface is the carbon style irregular surface 12*a* on which the carbon style pattern M is formed by the irregularities 12*b*. In this manner, in the dial plate 100, it is possible to apply the projecting flat parts 12*f* and 12*g* to the carbon style irregular surface 12*a*.

In the dial plate 100 described above, the main body 10*a* of the clear decoration body 10 includes the base material 11 that transmits light, and the clear layer 12 that is laminated on the surface at a side opposite to the viewing side of the base material 11 and that is formed with the carbon style irregular surface 12*a*. With this configuration, in the dial plate 100, it is possible to form the clear layer 12 by imprinting.

First Modification

Figure 7:
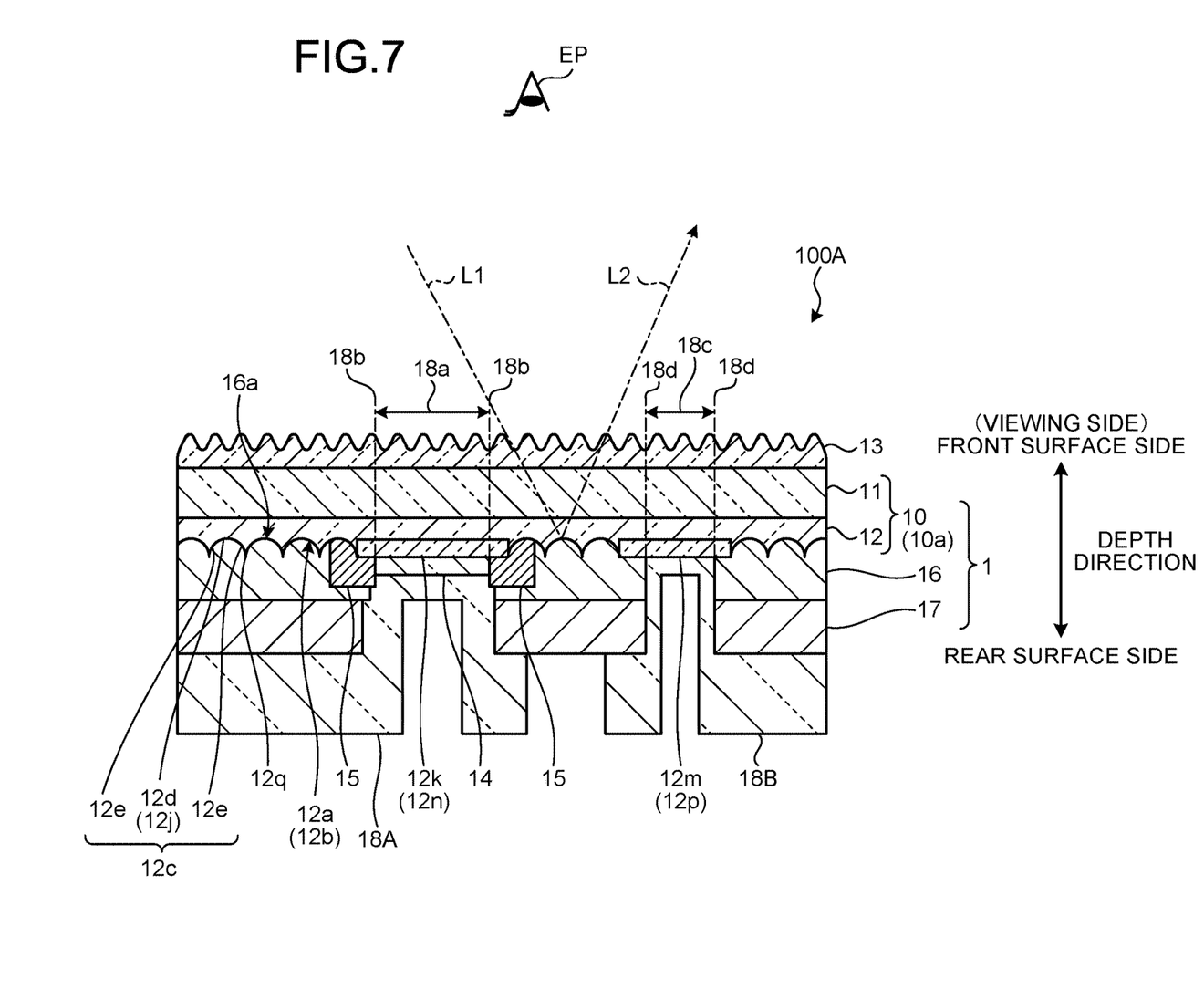
FIG. 7 is a sectional view illustrating a configuration example of a dial plate according to a first modification of the embodiment.

Next, a first modification of the embodiment will be described. FIG. 7 is a sectional view illustrating a configuration example of a dial plate 100A according to the first modification of the embodiment. It is to be noted that in the first modification, the same reference numerals denote the same components as those in the embodiment, and the detailed description thereof is omitted. The dial plate 100A according to the first modification is different from the dial plate 100 according to the embodiment in separately providing projecting flat parts 12*k* and 12*m* from the main body 10*a*. The projecting flat part 12*k* is provided on the character display area 18*a* of the carbon style irregular surface 12*a*. The projecting flat part 12*k* is formed separate from the main body 10*a*, and at least projects relative to the bottom part 12*j* of the irregularities 12*b* of the carbon style irregular surface 12*a*, toward a side opposite to the viewing side (rear surface side). For example, the projecting flat part 12*k* projects as high as the top part 12*q* of the irregularities 12*b* of the carbon style irregular surface 12*a* in the depth direction.

The projecting flat part 12*k* has a projecting flat surface 12*n* formed in a flat shape, at the rear surface side of the carbon style irregular surface 12*a*. The projecting flat surface 12*n* is formed larger than the first partition boundary 18*b* (character display area 18*a*) formed by the first partition layer 15, which will be described below when viewed from the viewing side. In other words, the projecting flat surface 12*n* protrudes more to the outside than the first partition boundary 18*b* formed by the first partition layer 15 when viewed from the viewing side. That is, the first partition boundary 18*b* formed by the first partition layer 15 is placed inside of the projecting flat surface 12*n* when viewed from the viewing side. With this configuration, in the dial plate 100A, it is possible to form the first partition boundary 18*b* formed by the first partition layer 15 within a range of the projecting flat surface 12*n*.

The projecting flat part 12*m* is provided on the indicator display area 18*c* of the carbon style irregular surface 12*a*. The projecting flat part 12*m* is formed separate from the main body 10*a*, and at least projects relative to the bottom part 12*j* of the irregularities 12*b* of the carbon style irregular surface 12*a*, toward a side opposite to the viewing side (rear surface side). For example, the projecting flat part 12*m* projects as high as the top part 12*q* of the irregularities 12*b* of the carbon style irregular surface 12*a* in the depth direction.

The projecting flat part 12*m* has a projecting flat surface 12*p* formed in a flat shape, at the rear surface side of the carbon style irregular surface 12*a*. The projecting flat surface 12*p* is formed larger than the first partition boundary 18*d* (indicator display area 18*c*) formed by the carbon colored layer 16 when viewed from the viewing side. In other words, the projecting flat surface 12*p* protrudes more to the outside than the first partition boundary 18*d* formed by the carbon colored layer 16 when viewed from the viewing side. That is, the first partition boundary 18*d* formed by the carbon colored layer 16 is placed inside of the projecting flat surface 12*p* when viewed from the viewing side. With this configuration, in the dial plate 100A, it is possible to form the first partition boundary 18*d* formed by the carbon colored layer 16 within a range of the projecting flat surface 12*p*.

In this manner, in the dial plate 100A according to the first modification, the projecting flat part 12*k* is formed separate from the main body 10*a* of the clear decoration body 10, and includes the projecting flat surface 12*n* formed in a flat shape. Moreover, the projecting flat part 12*m* is formed separate from the main body 10*a* of the clear decoration body 10, and includes the projecting flat surface 12*p* formed in a flat shape. With this configuration, in the dial plate 100A, it is possible to suppress a step from being formed on the printing surface by the projecting flat surface 12*n*, and suppress the first partition boundary 18*b* of the character display area 18*a* from becoming unclear. Moreover, in the dial plate 100A, it is possible to suppress a step from being formed on the printing surface by the projecting flat surface 12*p*, and suppress the first partition boundary 18*d* of the indicator display area 18*c* from becoming unclear.

Second Modification

Figure 8:
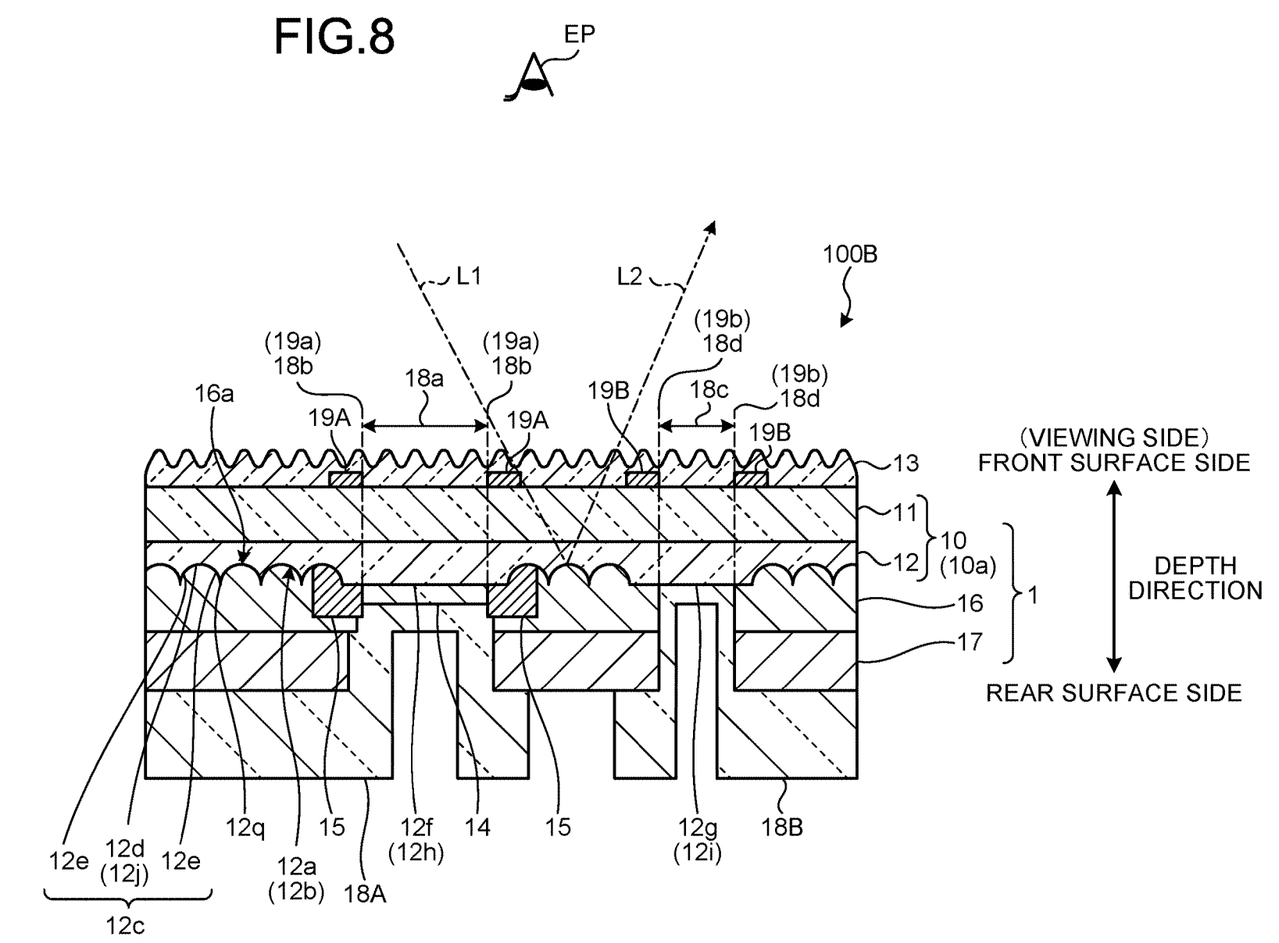
FIG. 8 is a sectional view illustrating a configuration example of a dial plate according to a second modification of the embodiment.

Next, a second modification of the embodiment will be described. FIG. 8 is a sectional view illustrating a configuration example of a dial plate 100B according to the second modification of the embodiment. It is to be noted that in the second modification, the same reference numerals denote the same components as those in the embodiment, and the detailed description thereof is omitted. The dial plate 100B according to the second modification is different from the dial plate 100 according to the embodiment in including second partition layers 19A and 19B at the viewing side of the base material 11.

The second partition layer 19A forms an outline of the design pattern relating to the vehicle. For example, the second partition layer 19A forms the outline of the design pattern that displays the speed of the vehicle on the dial plate 100B. The second partition layer 19A has a light-shielding property for shielding light, and for example, is colored in black or the like. The second partition layer 19A is laminated at the viewing side of the base material 11. For example, the second partition layer 19A is formed by printing an ink containing a resin material at the viewing side of the base material 11. For example, the second partition layer 19A is formed using the screen printing machine. The screen printing machine prints the ink colored in black or the like at the viewing side of the base material 11. For example, at the viewing side of the base material 11, the screen printing machine prints the ink along a second partition boundary 19*a*. The second partition layer 19A forms the outline of the character display area 18a (second partition boundary 19a), and shields the incident light from the viewing side (front surface side).

The second partition layer 19B forms an outline of the design pattern relating to the vehicle. For example, the second partition layer 19B forms the outline of the design pattern for displaying the indicator of the vehicle on the dial plate 100B. The second partition layer 19B has a light-shielding property for shielding light, and for example, is colored in black or the like. The second partition layer 19B is laminated at the viewing side of the base material 11. For example, the second partition layer 19B is formed by printing an ink containing a resin material at the viewing side of the base material 11. For example, the second partition layer 19B is formed using the screen printing machine. The screen printing machine prints the ink colored in black or the like at the viewing side of the base material 11. For example, at the viewing side of the base material 11, the screen printing machine prints the ink along a second partition boundary 19b. The second partition layer 19B forms the outline of the indicator display area 18c (second partition boundary 19b), and shields the incident light from the viewing side (front surface side).

In this manner, the dial plate 100B according to the second modification includes the second partition layer 19A that is laminated at the viewing side of the main body 10a of the clear decoration body 10, that shields light, and that forms the second partition boundary 19a of the character display area 18a matching with the first partition boundary 18b when viewed from the viewing side. Moreover, the dial plate 100B includes the second partition layer 19B that is laminated at the viewing side of the main body 10a of the clear decoration body 10, that shields light, and that forms the second partition boundary 19b of the indicator display area 18c matching with the first partition boundary 18d when viewed from the viewing side.

With this configuration, in the dial plate 100B, it is possible to form the second partition layers 19A and 19B on the front surface of the base material 11 formed in a flat shape. Consequently, for example, compared to when the second partition layers 19A and 19B are printed on the irregularities 12b of the carbon style irregular surface 12a, the dial plate 100B can suppress a step from being formed on the printing surface. Thus, it is possible to suppress dripping of ink and unevenness. Hence, in the dial plate 100B, it is possible to suppress the second partition boundary 19a of the character display area 18a from becoming unclear. Similarly, in the dial plate 100B, it is possible to suppress the second partition boundary 19b of the indicator display area 18c from becoming unclear. Consequently, even when the carbon style irregular surface 12a is provided, the dial plate 100B is capable of properly providing a design pattern.

Third Modification

Figure 9:
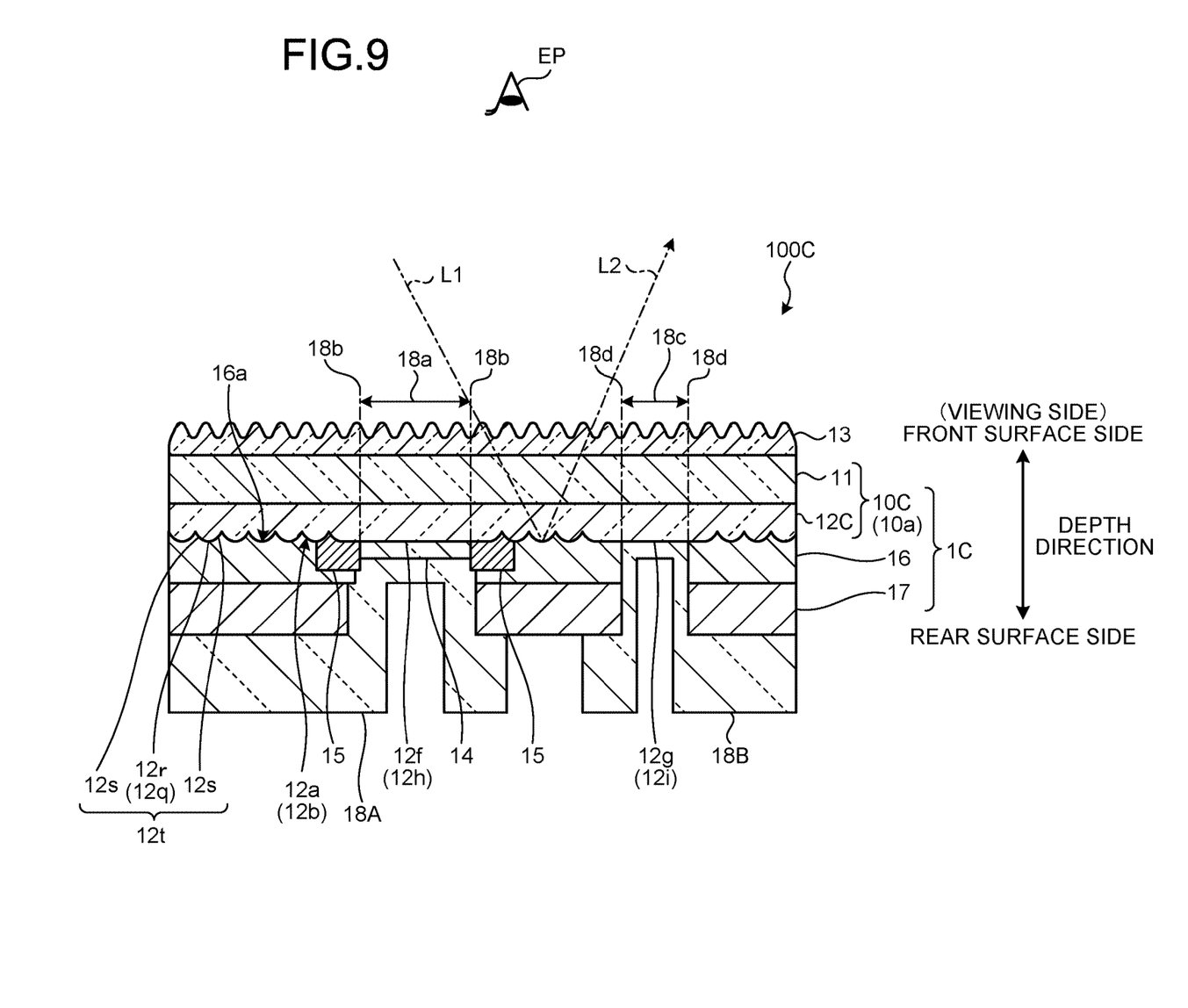
FIG. 9 is a sectional view illustrating a configuration example of a dial plate according to a third modification of the embodiment.

Next, a third modification of the embodiment will be described. FIG. 9 is a sectional view illustrating a configuration example of a dial plate 100C according to the third modification of the embodiment. As illustrated in FIG. 9, a carbon decoration panel 1C according to the third modification is different from the carbon decoration panel 1 according to the embodiment in forming the carbon style irregular surface 12a of a clear layer 12C in a convex shape from the viewing side toward a side opposite to the viewing side. It is to be noted that in the carbon decoration panel 1C according to the third modification, the same reference numerals denote the same components as those in the carbon decoration panel 1 according to the embodiment, and the detailed description thereof is omitted.

The carbon decoration panel 1C includes a clear decoration body 10C, the carbon colored layer 16, and the light-shielding printed layer 17. The clear decoration body 10C includes the base material 11 and the clear layer 12C.

The clear layer 12C has the carbon style pattern M. The clear layer 12C is provided at the rear surface side of the base material 11 by imprinting. For example, the clear layer 12C is formed of a photocurable resin material (ink) that transmits light of a wavelength in the visible light region, and that is cured by being irradiated with UV light. The clear layer 12C includes the carbon style irregular surface 12a. The carbon style irregular surface 12a is provided at a side opposite to the base material 11 of the clear layer 12C, and on which the carbon style pattern M is formed by the irregularities. The irregularities form a plurality of unit pattern bodies 12t. Each of the unit pattern bodies 12t configures the texture of an artificial carbon fiber bundle that artificially represents an actual carbon fiber bundle by a prepreg. In the unit pattern body 12t, the artificial carbon fiber that artificially represents the actual carbon fiber is formed one by one. The unit pattern body 12t includes a top surface part 12r and a pair of curved parts 12s. In the unit pattern body 12t, the top surface part 12r is formed in a convex shape from the viewing side toward a side opposite to the viewing side.

The carbon colored layer 16 includes the reflecting surface 16a at the carbon style irregular surface 12a side. The reflecting surface 16a is provided so as to come into contact with the irregularities 12b of the carbon style irregular surface 12a, and the shape of the carbon style irregular surface 12a is formed. In other words, the shape of the reflecting surface 16a is the same as that of the unit pattern body 12t of the carbon style irregular surface 12a. In the reflecting surface 16a, when viewed from the viewing (viewpoint EP) side, the texture of the artificial carbon fiber bundle is formed, and the artificial carbon fiber is formed one by one. The reflecting surface 16a reflects the incident light L1 that has transmitted through the clear decoration body 10C toward the viewing side as the reflecting light L2. The carbon style irregular surface 12a includes the projecting flat parts 12f and 12g, and the first partition layer 15 is printed on the projecting flat part 12f.

In this manner, the dial plate 100C according to the third modification includes the clear decoration body 10C, the first partition layer 15, and the carbon colored layer 16. The clear decoration body 10C includes the main body 10a that transmits light. The clear decoration body 10C also includes the carbon style irregular surface 12a that is provided at a side opposite to the viewing side of the main body 10a, and that is formed with the irregularities 12b for decoration. Moreover, the clear decoration body 10C includes the character display area 18a and the indicator display area 18c that light up and display the design pattern by transmitting light. The first partition layer 15 is laminated on the carbon style irregular surface 12a, shields light, and forms the first partition boundary 18b of the character display area 18a. The carbon colored layer 16 is laminated on the carbon style irregular surface 12a, shields light, and forms the first partition boundary 18d of the indicator display area 18c.

With this configuration, in the dial plate 100C, by printing the first partition layer 15 on the projecting flat part 12f, it is possible to form the first partition boundary 18b of the character display area 18a. Consequently, for example, compared to when the first partition layer 15 is printed on the irregularities 12*b*, the dial plate 100C can suppress a step from being formed on the printing surface. Thus, it is possible to suppress dripping of ink and unevenness. Hence, the dial plate 100C can suppress the first partition boundary 18*b* of the character display area 18*a* from becoming unclear. Moreover, in the dial plate 100C, by printing the carbon colored layer 16 on the projecting flat part 12*g*, it is possible to form the first partition boundary 18*d* of the indicator display area 18*c*. Consequently, for example, compared to when the carbon colored layer 16 is printed on the irregularities 12*b*, the dial plate 100C can suppress a step from being formed on the printing surface. Thus, it is possible to suppress dripping of ink and unevenness. Hence, in the dial plate 100C, it is possible to suppress the first partition boundary 18*d* of the indicator display area 18*c* from becoming unclear. As a result, even when the carbon style irregular surface 12*a* is provided, the dial plate 100C is capable of properly providing a design pattern.

In the above-mentioned explanation, the carbon style irregular surface 12*a* is used as the decoration surface in the dial plates 100, 100A, and 100B as an example. However, it is not limited thereto.

Moreover, the second partition layers 19A and 19B are provided by being combined with the first partition layer 15 and the like. However, it is not limited thereto, and the second partition layers 19A and 19B may be formed independently. In other words, in the dial plate 100B, the boundary of the character display area 18*a* may be formed only by the second partition boundary 19*a* formed by the second partition layer 19A. Moreover, in the dial plate 100B, the boundary of the indicator display area 18*c* may be formed only by the second partition boundary 19*b* formed by the second partition layer 19B.

Furthermore, the dial plates 100, 100A, and 100B each include the carbon decoration panel 1, the AG printed layer 13, the design color layer 14, the first partition layer 15, the carbon colored layer 16, the light-shielding printed layer 17, and the design layers 18A and 18B. However, it is not limited thereto, and the dial plates 100, 100A, and 100B may have other configurations.

Still furthermore, in the main body 10*a* of the clear decoration body 10, the base material 11 and the clear layer 12 are separately formed by imprinting. However, it is not limited thereto. For example, in the main body 10*a* of the clear decoration body 10, the base material 11 and the clear layer 12 may be integrally formed by resin injection molding.

Still furthermore, the clear layer 12 is formed on the base material 11 by the UV cured imprinting. However, it is not limited thereto, and for example, a thermal curable imprinting may also be used.

Still furthermore, in the dial plates 100, 100A, and 100B, the AG printed layer 13 is used as the low reflection layer. Alternatively, the low reflection layer may be configured using a member other than the AG printed layer 13.

Still furthermore, the AG printed layer 13, the design color layer 14, the first partition layer 15, the carbon colored layer 16, the light-shielding printed layer 17, and the design layers 18A and 18B are formed using the screen printing machine. However, it is not limited thereto, and for example, an ink jet printer and the like may also be used.

Still furthermore, in the dial plate 100A, the carbon style irregular surface 12*a* of the clear layer 12 may be formed in a convex shape from the viewing side toward a side opposite to the viewing side.

The design pattern area of the dial plate according to the present embodiment is provided with the projecting flat part that at least projects relative to the bottom part of the irregularities of the decoration surface toward a side opposite to the viewing side and that is formed in a flat shape. Consequently, the dial plate according to the present invention is capable of properly providing a design pattern.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dial plate, comprising:
    a clear decoration body that includes a main body capable of transmitting light, and that includes a decoration surface provided at a side opposite to a viewing side of the main body and formed with an irregularity for decoration, and a design pattern area capable of lighting up and displaying a design pattern by transmitting light; and
    a first partition layer that is laminated on the decoration surface, that shields light, and that forms a first partition boundary of the design pattern area, wherein
    the design pattern area of the clear decoration body is provided with a projecting flat part that at least projects relative to a bottom part of the irregularity of the decoration surface toward a side opposite to the viewing side and that is formed in a flat shape, and
    the projecting flat part has a projecting flat surface formed in a flat shape, at a rear surface side of the decoration surface, and the projecting flat surface protrudes more to an outside than the first partition boundary formed by the first partition layer when viewed from the viewing side.

2. The dial plate according to claim 1, wherein
    the decoration surface is a carbon style irregular surface on which a carbon style pattern is formed by the irregularity.

3. The dial plate according to claim 1, wherein
    the main body includes a base material capable of transmitting light and a clear layer that is laminated on a surface at a side opposite to the viewing side of the base material and that is formed with the decoration surface.

4. The dial plate according to claim 1, further comprising:
    a second partition layer that is laminated at the viewing side of the main body, that shields light, and that forms a second partition boundary of the design pattern area matching with the first partition boundary when viewed from the viewing side.

5. The dial plate according to claim 4, wherein
    the decoration surface is a carbon style irregular surface on which a carbon style pattern is formed by the irregularity.

6. The dial plate according to claim 4, wherein
    the main body includes a base material capable of transmitting light and a clear layer that is laminated on a surface at a side opposite to the viewing side of the base material and that is formed with the decoration surface.

7. The dial plate according to claim 1, wherein
    the projecting flat part is formed separate from the main body, and includes the projecting flat surface formed in a flat shape.

8. The dial plate according to claim 7, further comprising:
    a second partition layer that is laminated at the viewing side of the main body, that shields light, and that forms a second partition boundary of the design pattern area matching with the first partition boundary when viewed from the viewing side.

9. The dial plate according to claim 7, wherein
the decoration surface is a carbon style irregular surface on which a carbon style pattern is formed by the irregularity.

10. The dial plate according to claim 7, wherein
the main body includes a base material capable of transmitting light and a clear layer that is laminated on a surface at a side opposite to the viewing side of the base material and that is formed with the decoration surface.

11. The dial plate according to claim 1, wherein
the projecting flat part is integrally formed with the main body, and includes the projecting flat surface formed in a flat shape.

12. The dial plate according to claim 11, further comprising:
a second partition layer that is laminated at the viewing side of the main body, that shields light, and that forms a second partition boundary of the design pattern area matching with the first partition boundary when viewed from the viewing side.

13. The dial plate according to claim 11, wherein
the decoration surface is a carbon style irregular surface on which a carbon style pattern is formed by the irregularity.

14. The dial plate according to claim 11, wherein
the main body includes a base material capable of transmitting light and a clear layer that is laminated on a surface at a side opposite to the viewing side of the base material and that is formed with the decoration surface.

* * * * *